(12) United States Patent
Floyd et al.

(10) Patent No.: US 8,866,079 B2
(45) Date of Patent: Oct. 21, 2014

(54) COMPACT IMAGING RECEIVER ARCHITECTURE

(75) Inventors: Brian A. Floyd, Raleigh, NC (US); Vipul Jain, Irvine, CA (US); Arun S. Natarajan, Yorktown Heights, NY (US); Scott K. Reynolds, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 12/700,397

(22) Filed: Feb. 4, 2010

(65) Prior Publication Data

US 2011/0187585 A1 Aug. 4, 2011

(51) Int. Cl.
*G01J 1/00* (2006.01)
*G01S 13/00* (2006.01)
*G01S 3/02* (2006.01)
*G01S 7/04* (2006.01)

(52) U.S. Cl.
CPC .. *G01S 7/04* (2013.01); *G01S 13/00* (2013.01)
USPC .......................... 250/336.1; 342/351; 342/179

(58) Field of Classification Search
USPC .......................... 250/336.1; 342/179, 203, 351
See application file for complete search history.

(56) References Cited

U.S. PATENT DOCUMENTS

| | | | | |
|---|---|---|---|---|
| 3,070,747 A | * | 12/1962 | Addleman | 455/302 |
| 4,101,893 A | * | 7/1978 | Lewis | 342/411 |
| 4,724,439 A | * | 2/1988 | Wiley et al. | 342/351 |
| 5,606,283 A | * | 2/1997 | Allen et al. | 330/124 R |
| 5,815,113 A | * | 9/1998 | Lo et al. | 342/351 |
| 6,441,783 B1 | * | 8/2002 | Dean | 342/372 |
| 6,777,684 B1 | | 8/2004 | Volkov et al. | |
| 6,828,556 B2 | | 12/2004 | Pobanz et al. | |
| 7,052,176 B2 | | 5/2006 | Stephan et al. | |
| 7,135,848 B1 | | 11/2006 | Ammar | |
| 7,197,356 B2 | | 3/2007 | Carr | |
| 7,202,757 B2 | * | 4/2007 | De Flaviis | 333/26 |
| 7,415,244 B2 | | 8/2008 | Kolinko et al. | |
| 7,522,274 B2 | | 4/2009 | Salmon | |
| 8,036,627 B2 | * | 10/2011 | Teillet et al. | 455/323 |

OTHER PUBLICATIONS

Chirala, M.K., et al. "Millimeter-Wave Lange and Ring-Hybrid Couplers in a Silicon Technology for E-Band Applications", [International Microwave Symposium Digest, Jun. 2006, pp. 1547-1550].
Dicke, R.H. "The Measurement of Thermal Radiation at Microwave Frequencies", The Review of Scientific Instruments, vol. 17, No. 7, Jul. 1946, pp. 268-275.
Kangaslahti, P., et al. "Planar Polarimetry Receivers for Large Imaging Arrays at Q-Band"; Microwave Symposium Digest, 2006. IEEE MTT-S International; 11-16; Jun. 2006; pp. 89-92.
Kettle, D., et al. "A KA-Band INP MMIC 180 [Degree] Phase Switch"; Microwave and Wireless Components Letters; IEEE; vol. 15, Issue 6, Jun. 2005, pp. 425-427.
Millitech LLC, "Microwave and Millimeter Wave Radiometry", Technology Note, Rev. 01 C 091801 (Sep. 2001), pp. 1-10, www.millitech.com/pdfs/Radiometer.pdf.

* cited by examiner

*Primary Examiner* — David Porta
*Assistant Examiner* — Mindy Vu
(74) *Attorney, Agent, or Firm* — Tutunjian & Bitetto, P.C.; Anne V. Dougherty (57) ABSTRACT

A system and method is shown for receiving microwave/millimeter-wave signals. The system and method are balanced and can be effectively implemented on a silicon substrate using single pole double throw switches.

20 Claims, 8 Drawing Sheets

COMPACT IMAGING RECEIVER ARCHITECTURE

GOVERNMENT RIGHTS

This invention was made with Government support under Contract No.: N66001-08-C2016 awarded by the Defense Advanced Research Projects Agency (DARPA). The Government has certain rights in this invention.

BACKGROUND

1. Technical Field

The present invention relates to radiometric imaging receivers and, more particularly, to implementations of microwave/millimeter-wave radiometers on silicon integrated circuits.

2. Description of the Related Art

Microwave and millimeter-wave radiometers, or radiometric imaging receivers, are used for a wide variety of purposes. Microwave radiometers were originally developed for radio astronomy, and have also been used for industrial and medical temperature measurement. Recently, there has been increasing interest in such radiometers for security and medical imaging. Traditionally, microwave radiometers have been implemented using relatively expensive microwave and millimeter-wave receiving techniques.

Figure 1:
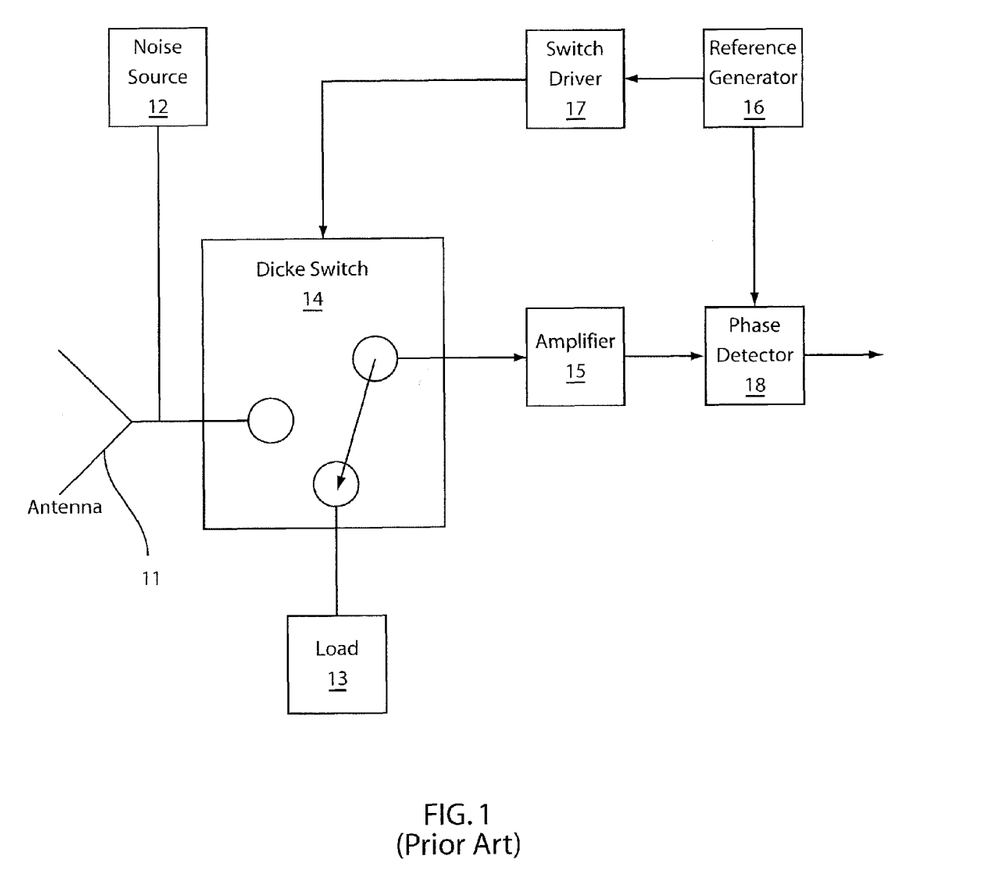
FIG. 1 shows a block diagram of a prior art Dicke switch receiver.

One of the most popular architectures for imaging receivers is the direct-detection receiver architecture, as shown in FIG. 1. The imaging receiver provides at its output an estimation of the antenna temperature by averaging the statistical noise fluctuations at the antenna. Unfortunately, fluctuations in receiver gain can cause relatively large variations at the receiver output, masking the desired output produced by noise fluctuations alone.

For the architecture shown in FIG. 1, the minimum detectable temperature difference ($\Delta T$) between an antenna temperature $T_A$ and a known reference temperature $T_C$ is given by $$\frac{\Delta T}{T_{sys}} = 2\sqrt{\frac{1}{B\tau} + \left(\frac{\Delta G}{G}\right)^2}, \quad (1)$$

where $T_{sys}$ is the overall system temperature at the receiver input, B is the receiver bandwidth, G is receiver gain, and $\tau$ is the integration time. $\Delta T$ can be made largely independent of receiver gain variations by switching the receiver input between the antenna and a known reference load at some frequency $f_M$ using a Single Pole Double Throw (SPDT) switch, known as a Dicke switch or Dicke modulator.

In FIG. 1, an SPDT Dicke switch 14 is placed in front of the amplifier 15. The switch 14 takes as inputs first a signal from antenna 11, which comes mixed with some amount of noise 12, and second a resistor load 13. A reference generator 16 feeds into a switch driver 17 to rapidly oscillate the switch 14. Finally, a phase detector 18 takes the output of the amplifier 15 and the reference generator 16 to produce an output.

Unfortunately, the placement of the switch 14 in front of the amplifier 15 results in an increased receiver noise figure, or equivalently an increase in $T_{sys}$, deteriorating the imaging resolution (corresponding to a higher $\Delta T$ in equation (1)). Several solutions to this problem have been presented.

One such attempted solution utilized a balanced topology. However, such prior art architectures used components which are difficult to implement on silicon. The prior art architectures required at least four couplers, components which are very lossy when implemented on a silicon substrate. Furthermore, the couplers required an accurate 50Ω or open-circuit termination to function as intended. It is difficult to provide such terminations at millimeter-wave frequencies using silicon metal-oxide-semiconductor field-effect transistors (MOSFETs) or heterojunction bipolar transistor (HBTs), and each additional coupler effectively increases the noise. Further designs have used hybrid ring couplers, but such designs have lacked a balanced topology.

SUMMARY

In response to the need for small, cost-efficient microwave imaging devices, an architecture for a compact imaging receiver is disclosed which may advantageously be implemented on silicon. Such architectures according to the present principles advantageously have a balanced topology, along with the stability associated with such topologies, but minimize the number of couplers required.

A system/method for processing received microwave imaging information includes coupling a plurality of input signals to produce a plurality of combined signals, splitting each combined signal into a pair of out-of-phase signals, selecting one signal from each pair of out-of-phase signals based on a select signal, and coupling the selected signals to produce an output signal that is based on one of the input signals.

A further system/method for processing received microwave imaging information includes applying an antenna signal and a reference signal to a first 90° coupler to produce two coupled signals, amplifying the signals output by the first coupler, splitting input signals into out-of-phase pairs, selecting one signal from each pair of signals, comparing phase shifts of the selected signals, and applying either an amplified version of the antenna signal to a detection circuit or an amplified version of the reference signal to the detection circuit in accordance with said comparison.

A microwave imaging receiver is disclosed which includes a plurality of phase splitters, each receiving a different combination of input signals and each producing two signals which are out of phase with respect to one another, a plurality of switches, each receiving the output of one of said phase splitters and each selecting one phase according to a select signal, and a coupler that receives the selected signals from said switches and produces an output signal based on one of the input signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 2:
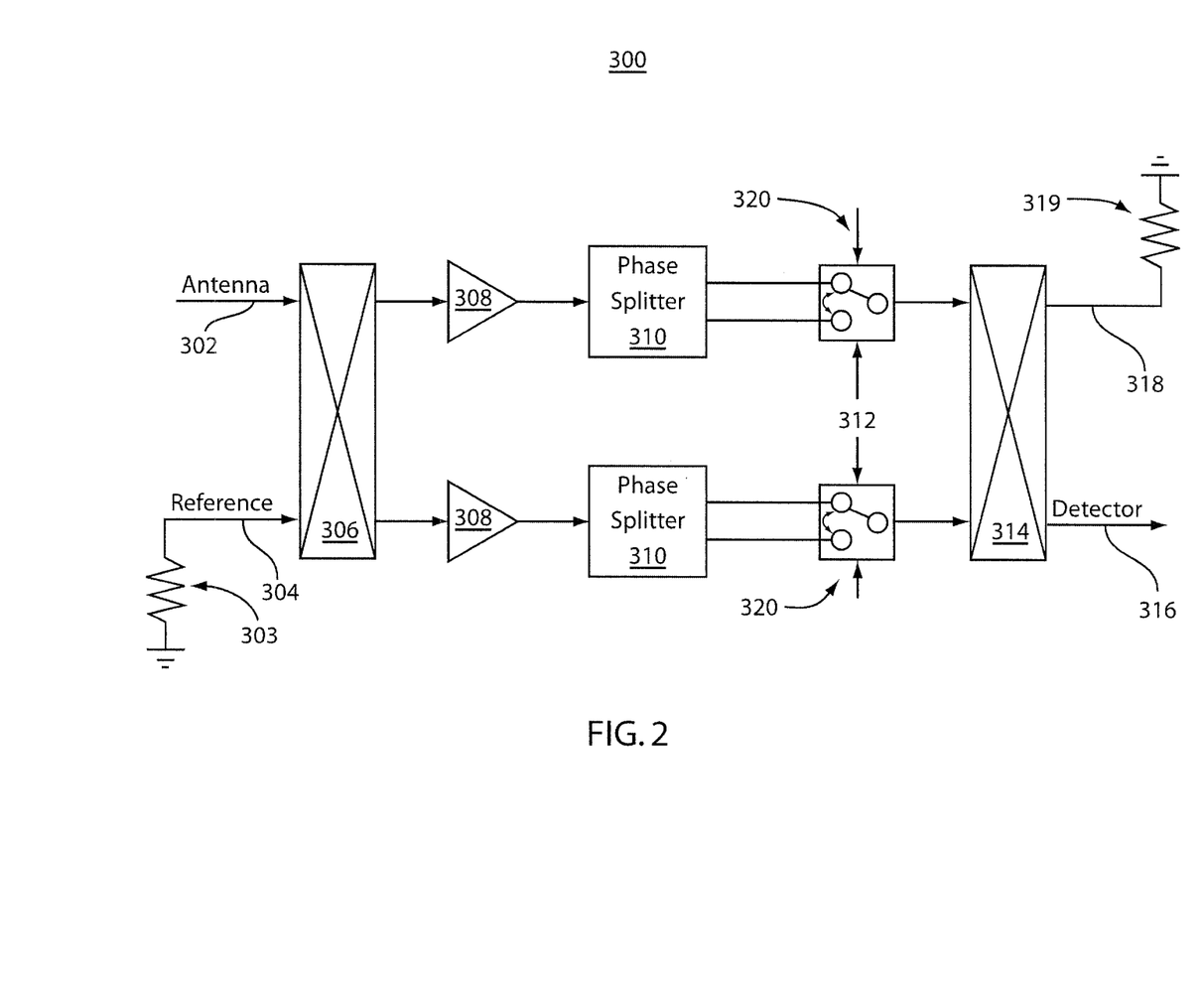
FIG. 2 shows an exemplary design for a balanced receiver according to the present principles that uses two single pole double throw (SPDT) switches and employs only two couplers.

The present principles describe a fully-balanced radiometer architecture that is highly advantageous for a silicon implementation. Referring generally to FIG. 2, an embodiment of the present principles is shown which accomplishes fully-balanced receiving using only two couplers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the present invention will be described in terms of a given illustrative architecture having a silicon on insulator wafer; however, other architectures, structures, substrate materials and process features and steps may be varied within the scope and spirit of the present invention.

The circuit as described herein may be part of a design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now in detail to the drawings in which like numerals represent the same or similar elements and initially to FIG. 2, a balanced microwave radiometer architecture 300, suitable for use on silicon, is shown. The design incorporates single pole double throw (SPDT) switches, but does not suffer from the noise penalty that arises in classic Dicke switches due to the fact that the present switches are implemented at relatively high signal levels, after the gain of amplifiers 308. A first 3 dB, 90° hybrid coupler 306 receives an input signal 302 from an antenna (not shown) and a reference signal 304 from a resistor 303 having a known thermal noise.

The first coupler 306 combines the input signals 302 and 304 into two combined signals with a phase difference of 90°, each of which then passes to a high-gain low-noise amplifier (LNA) 308. The amplified signals then pass to phase splitters 310. The phase splitters 310 further divide the respective amplified signals each into two signals that are 180° out-of-phase with each other. In a preferred embodiment, one split signal will have a phase shift of 0° and the other will have a phase shift of 180°.

Each phase splitter 310 then passes its split signals to an SPDT switch 312. The SPDT switches 312 each select one signal to pass on to a second 3 dB, 90° hybrid coupler 314 according to a select signal 320. The second coupler 314 then combines the two phase-shifted signals into the output 316. Depending on whether the phase shift between the two selected signals is the same or different (e.g., whether they are both shifted by the same amount or, alternatively, whether one is shifted by 0° and the other by 180°), either an amplified version of the antenna input 302 or an amplified version of the reference input 304 may be obtained. By rapidly switching the SPDT switches 312 between the two phase-shifted inputs, either the antenna input 302 or the reference input 304 can be obtained at the output, thereby accomplishing the Dicke switch functionality. Resistor 319 is included for correct operation of coupler 314, terminating one port of the coupler in its characteristic impedance (often, but not necessarily, 50Ω). The select signals 320 may be implemented as a square wave to accomplish this switching. The above-described receiver 300 is fully balanced and advantageously requires only two couplers.

Figure 3A:
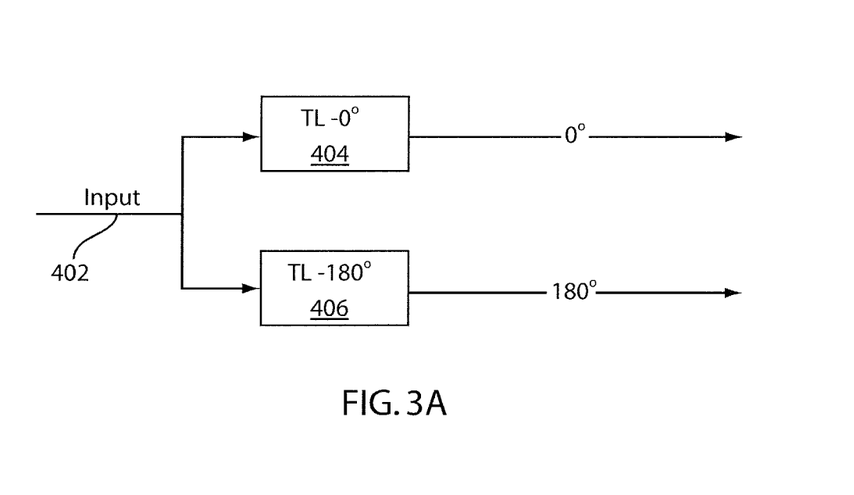
FIG. 3a shows a block diagram of an exemplary design for a phase splitter according to the present principles.

There are multiple possibilities for the design of the phase splitters 310 to be used in receiver 300. Referring now to FIG. 3a, an exemplary design for a phase splitter is shown. This design is transmission-line based. The input signal 402 is split into two paths. The first path passes through a first transmission line 404 and becomes a 0° phase output. The second path passes through a second transmission line 406. The second transmission line 406 is of such a length as to produce a 180° phase difference relative to the first transmission line 404.

Figure 3B:
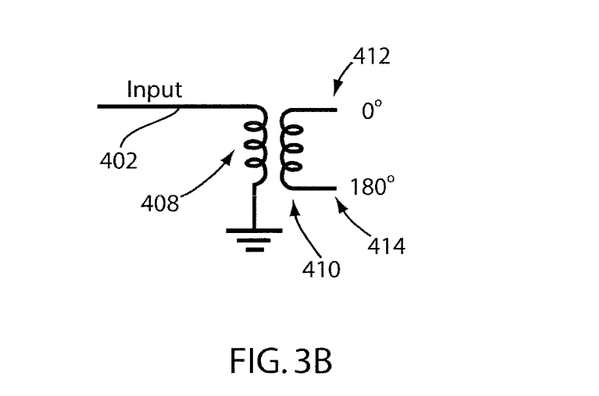
FIG. 3b shows a circuit diagram of an alternative design for a phase splitter according to the present principles.

Referring to FIG. 3b, an alternative design for a phase splitter is shown. This phase splitter design uses a balun comprising two coils of wire 408 and 410. The input signal 402 travels through the first coil 408, inducing a current in the second coil 410. This produces two signals 412 and 414 as shown, one matching the phase of input 402 and the other shifted by 180°. The phase splitter designs shown in FIGS. 4a and 4b are both compatible with silicon technologies.

Figure 4A:
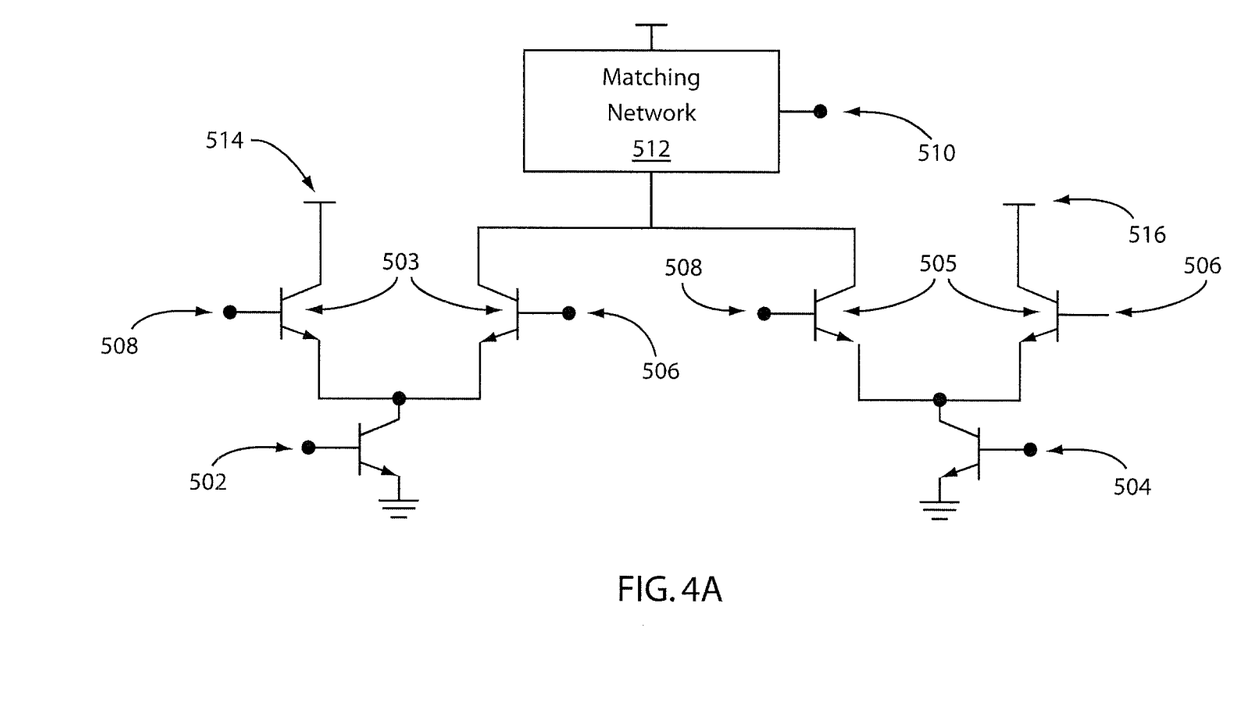
FIG. 4a shows an exemplary design for an SPDT switch according to the present principles.

Referring now to FIG. 4a, an exemplary design for the SPDT switches is shown. The design of FIGS. 4a, 4b, and 4c is based on a current-steering topology. By changing the state of the select signals 506 and 508, either of the two inputs 502 and 504 can be connected to output 510. Output 510 corresponds to the input ports of coupler 314 in FIG. 2. Impedance matching networks 512 may be placed at different nodes in the circuit as needed. Nodes 514 and 516 in FIG. 4a are DC supply connections, at ground potential for AC signals.

Figure 4B:
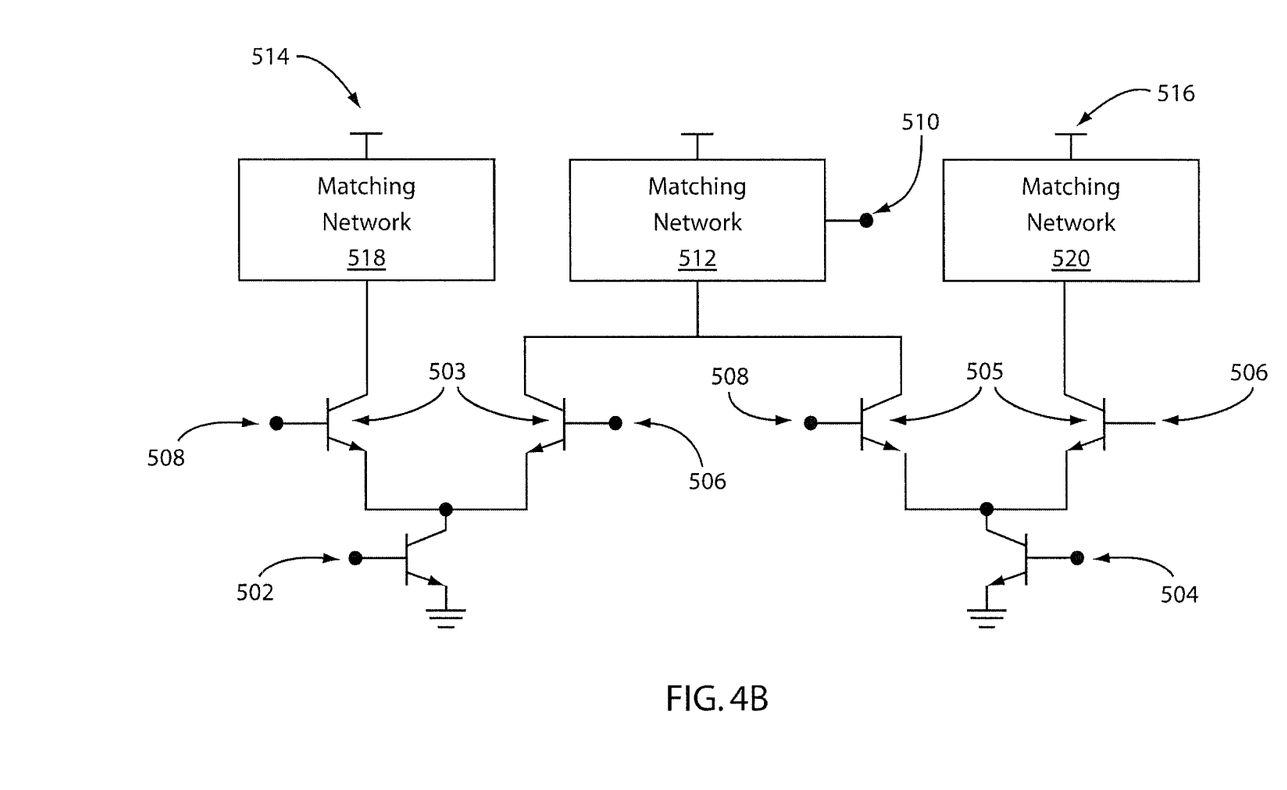
FIG. 4b shows an alternative design for an SPDT switch according to the present principles that employs additional matching networks.
Figure 4C:
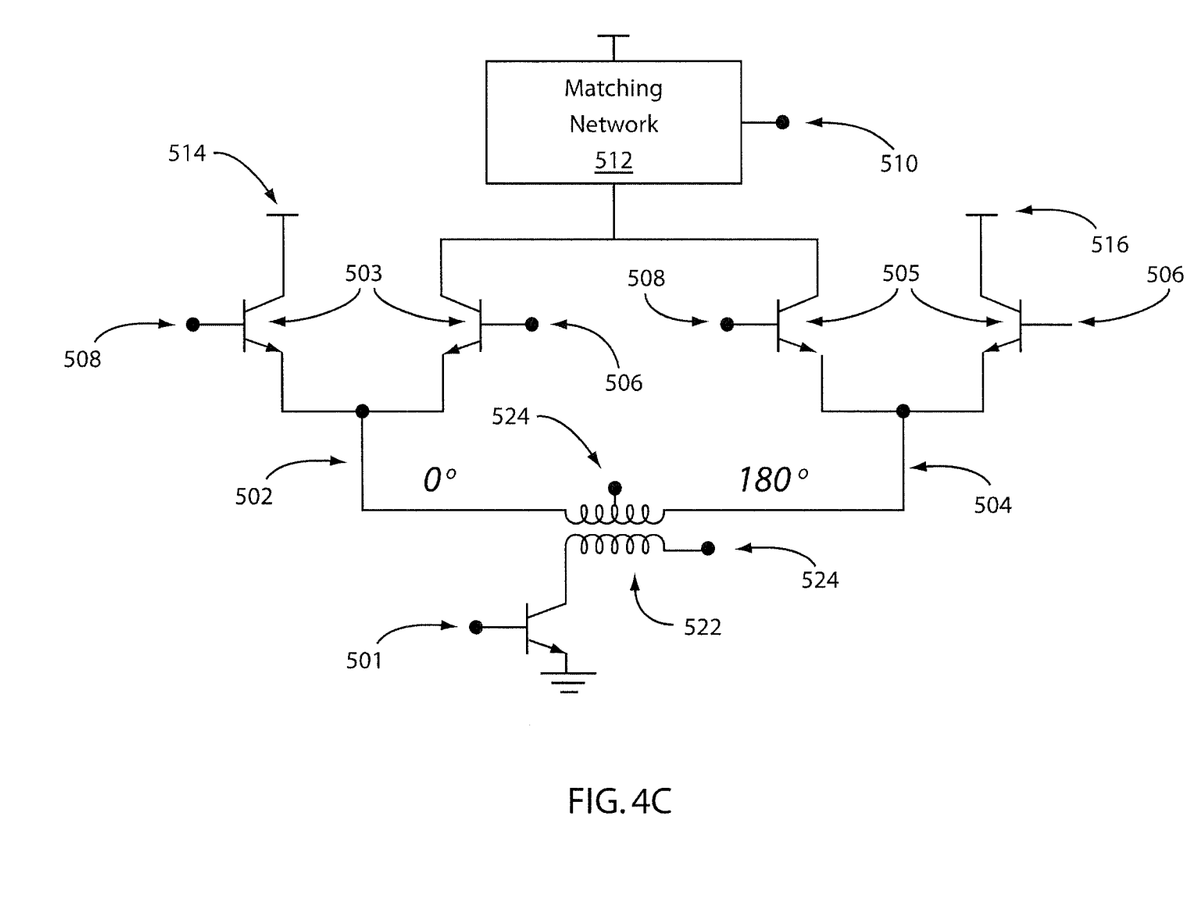
FIG. 4c shows an alternative design for an SPDT switch according to the present principles that incorporates a balun-based phase splitter.

Referring to FIG. 4b, an alternative design is shown with additional matching networks 518 and 520 at the outputs 514 and 516 of the unused branches of the differential pairs 503 and 505. Impedance matching networks may also be placed (and are often very useful) at the inputs 502 and 504 for maximum power transfer. Note that the current-steering SPDT switch of FIG. 4b provides a constant impedance at its output in both switch states, thereby obviating the need for a coupler. This provides a significant improvement over prior art architectures. Furthermore, current-steered SPDT switches do not require accurate 50Ω or open circuits.

Referring to FIG. 4c, an exemplary design for a SPDT switch is shown which receives its inputs from a balun-based phase splitter 522, such as that shown in FIG. 4b. The 180° out of phase inputs 502 and 504 to the differential pairs 503 and 505 are produced by balun 522. An input 501 comes from an LNA (such as element 308 in FIG. 2). The balun is biased at two points 524 and produces two outputs 502 and 504, 180° out of phase. This embodiment can be made particularly compact in a silicon embodiment. Furthermore, because the input transistor 501 and the switching differential pairs 503 and 505 can now be biased separately, this topology is particularly useful in complementary metal-oxide-semiconductor (CMOS) implementations which employ low-voltage operation.

Figure 5:
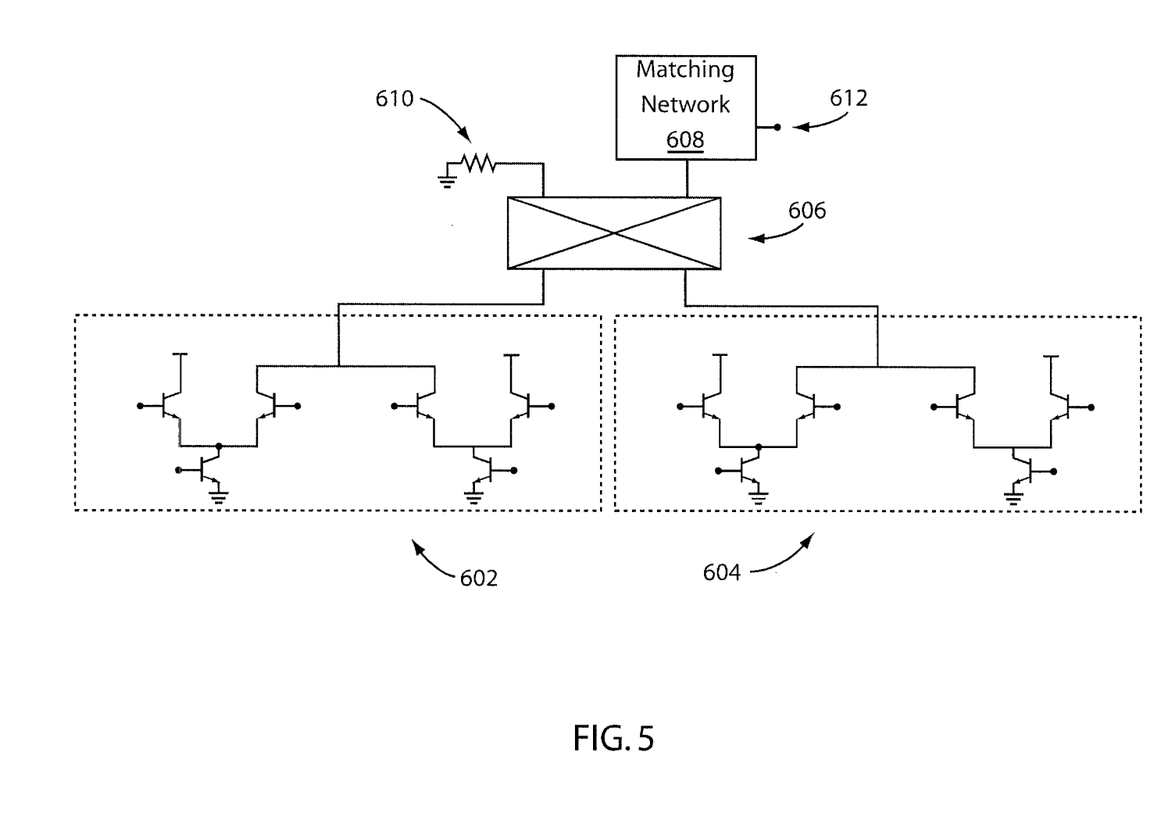
FIG. 5 shows a circuit diagram of an exemplary design for a switch and second arrangement according to the present principles.

Referring now to FIG. 5, an exemplary design is shown using two SPDT switches 602 and 604 according to the present principles, from the two paths of the balanced architecture shown in FIG. 2, feed into output coupler 606. A matching network 608 can then be placed at the coupler output for maximum power transfer to the detector input 612. Resistor 610 corresponds to resistor 319 in FIG. 2. It is included for correct operation of coupler 606 and terminates one port of the coupler in its characteristic impedance (often, but not necessarily, 50Ω).

Figure 6:
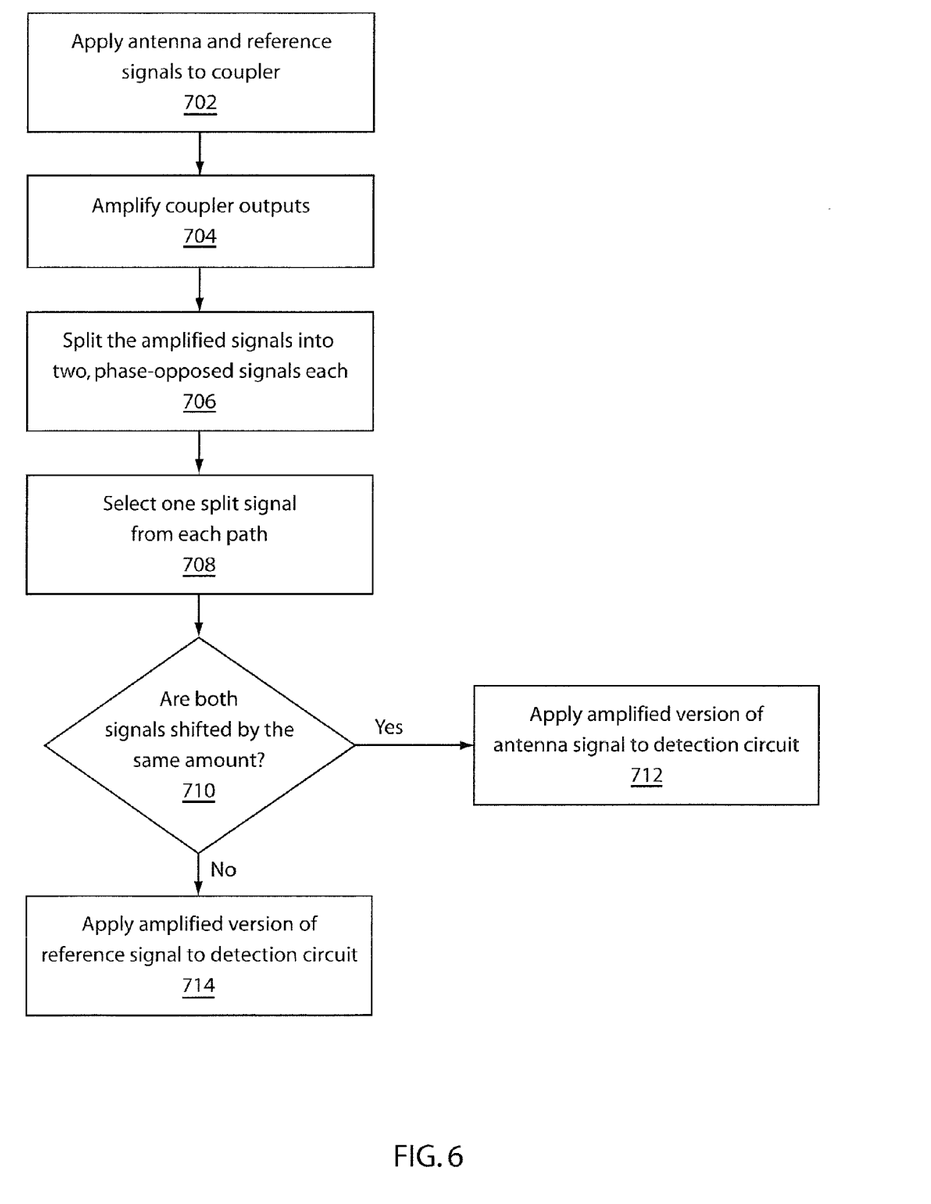
FIG. 6 shows a block/flow diagram setting forth a system/method for microwave imaging.

Referring to FIG. 6, a block/flow diagram illustrating a system/method for microwave imaging is shown. At block 702, antenna and reference signals are applied to the input ports of a first 90° coupler. At block 704, the outputs of the first 90° coupler are amplified. At block 706, each amplified signal is split by a 0°/180° phase splitter, producing signals that are either 0° or 180° phase shifted from the amplified signal input to the splitter. At block 708, one signal from each path is selected.

At decision block 710, it is determined whether both phase splitters are set to produce the same phase shift (i.e., whether both are set to produce 0° or 180° shifts). If both phase splitters are set to produce the same phase shift, an amplified version of the antenna signal is applied to a signal detection circuit at block 712. If the phase splitters are set to produce differing phase shifts, an amplified version of the reference signal is applied to the signal detection circuit at block 714. This step can be accomplished automatically through hardware, as the contributions of one signal or another cancel out if they are 180 degrees out of phase. The procedure then returns to block 702 to consider the signals again, allowing the Dicke switch to alternate between antenna and reference signals.

Dicke switches allow for accurate reception of microwave signals. The present principles allow for Dicke switches to be implemented on silicon integrated circuits, making them smaller and less expensive than prior art designs. This will allow for greater use in high volume applications and area arrays. As a result, microwave imaging technologies based on the present principles will be available for entirely new applications, such as in the fields of security and medical imaging. The balanced topology disclosed by the present principles additionally makes the present embodiments well-suited to passive imaging applications.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for processing received microwave imaging information, comprising the steps of:
   coupling a plurality of input signals with a coupler to produce a plurality of combined signals;
   splitting each combined signal into a pair of out-of-phase signals;
   selecting one signal from each pair of out-of-phase signals; and
   coupling the selected signals to produce an output signal that is based on one of the input signals.

2. The method of claim 1, further comprising the step of amplifying the combined signals before the step of splitting, such that the output signal produced is an amplified version of one of the input signals.

3. The method of claim 1, further comprising the step of alternating the signal selection at a fixed rate.

4. The method of claim 1, wherein the signals in each split signal pair are 180° degrees out of phase with respect to one another.

5. The method of claim 1, wherein the input signals are an antenna signal and a reference signal.

6. The method of claim 1, wherein said coupling of the selected signals produces an output signal in accordance with a comparison between the selected signals.

7. The method of claim 6, wherein a first input signal is output if the selected signals have been phase shifted by the same amount and wherein a second input signal is output if the selected signals have been phase shifted by different amounts.

8. A method for processing received microwave imaging information, comprising the steps of:
   applying an antenna signal and a reference signal to a first 90° coupler to produce two coupled signals;
   amplifying the coupled signals;
   splitting the amplified signals input signals into out-of-phase pairs;
   selecting one signal from each pair of signals;
   comparing phase shifts of the selected signals; and applying either an amplified version of the antenna signal to a detection circuit or an amplified version of the reference signal to the detection circuit in accordance with said comparison.

9. The method of claim 8, further comprising the step of alternating the signal selection at a fixed rate.

10. A radiometric imaging receiver that accepts at least two input signals, comprising:
   a plurality of phase splitters, each receiving a different combination of input signals and each producing two signals which are out of phase with respect to one another;
   a plurality of switches, each receiving the output of one of said phase splitters and each selecting one phase according to a select signal; and
   a coupler that receives the selected signals from said switches and produces an output signal based on one of the input signals.

11. The radiometric imaging receiver of claim 10, wherein the phase splitters comprise baluns.

12. The radiometric imaging receiver of claim 10, wherein the phase splitters comprise a transmission line and a phase shifter.

13. The radiometric imaging receiver of claim 10, wherein the splitters produce two versions of an input signal being 180° out of phase with respect to one another.

14. The radiometric imaging receiver of claim 10, wherein the switch is a single pole double throw (SPDT) switch.

15. The radiometric imaging receiver of claim 14, wherein the SPDT switch is a balanced, current-steering switch.

16. The radiometric imaging receiver of claim 10, wherein the receiver is implemented on a silicon substrate.

17. The radiometric imaging receiver of claim 10, further comprising a plurality of amplifiers which amplify the combination of input signals and output the amplified signals to the phase splitters.

18. The radiometric imaging receiver of claim 10, further comprising a coupler that accepts the input signals and produces combinations of the input signals.

19. The radiometric imaging receiver of claim 18, wherein the couplers are 90° hybrid couplers.

20. The radiometric imaging receiver of claim 10, wherein the input signals are an antenna signal and a reference signal.

* * * * *